United States Patent

[11] 3,590,782

| [72] | Inventor | Itzhak Kantor |
| | | Doar Na Menashe, Hof Hacarmel, Israel |
| [21] | Appl. No. | 823,061 |
| [22] | Filed | May 8, 1969 |
| [45] | Patented | July 6, 1971 |
| [73] | Assignee | Plasson Maagan Michael Industrial Ltd. |
| | | Doar Na Menashe, Hof Hacarmel, Israel |
| [32] | Priority | May 15, 1968 |
| [33] | | Great Britain |
| [31] | | 23004/68 |

[54] RESTRICTED OSCILLATING TYPE SUSPENDED POULTRY DRINKING FOUNTAIN
4 Claims, 2 Drawing Figs.

| [52] | U.S. Cl. | 119/81 |
| [51] | Int. Cl. | A01k 7/00 |
| [50] | Field of Search | 119/81; 251/228 |

[56] References Cited
UNITED STATES PATENTS

| 1,033,308 | 7/1912 | Fish | 119/81 |
| 1,210,601 | 1/1917 | Clark | 119/81 |
| 2,669,220 | 2/1954 | Goff | 119/81 |
| 2,821,167 | 1/1958 | Gilbertson | 119/81 |
| 3,283,746 | 11/1966 | Ruter | 119/81 |

Primary Examiner—Aldrich F. Medbery
Attorney—Benjamin J. Barish

ABSTRACT: A suspension-type poultry drinking fountain comprises a water trough, a valve, a freely swinging hanger supporting the trough in freely swinging suspension, a resilient mounting suspending a trough from the hanger such that when the water in the trough drops below a predetermined quantity the trough rises and opens the valve to permit more water to flow to the trough, and a mounting for supporting a weight, the weight mounting being attached directly to the hanger independently of the resilient mounting, whereby the weight minimizes swinging of the hanger and trough but does not affect the sensitivity of the resilient mounting of the trough for operating the valve.

INVENTOR
ITZHAK KANTOR

BY *Benjamin J. Barish*

ATTORNEY

RESTRICTED OSCILLATING TYPE SUSPENDED POULTRY DRINKING FOUNTAIN

BACKGROUND OF THE INVENTION

1. Field of the Invention

The present invention relates to freely swinging suspension-type poultry drinking fountains, and particularly to such fountains which include a resilient mounting for the water trough which controls a valve for automatically replenishing the supply of water to the trough.

2. Description of the Prior Art

A number of the foregoing suspension-type poultry drinking fountains are well known and in wide-spread use, but one of the serious drawbacks not completely solved in the known types is the tendency of the suspended drinking trough to swing as the poultry drink therefrom. One known type attempts to solve this problem by providing an internal chamber within the trough and filling it with ballast water; but this arrangement affects the sensitivity of the operation of the valve since the ballast is supported with the trough on the resilient mounting which control the valve. Another proposal for solving this swinging problem is by the use of a restraining member which engages, or is fixed to, the trough and is embedded in the ground; but this arrangement may also affect the sensitivity of the resilient mounting for operating the valve, and further in some areas the ground is paved and therefore does not lend itself to the insertion of the restraining member.

An object of the present invention is to solve the above swinging problem in this type of fountain in a manner which is very simple and which does not effect the sensitivity of the valve operation.

SUMMARY OF THE PRESENT INVENTION

According to the present invention, there is provided a suspension-type poultry drinking fountain comprising a water trough adapted to contain the poultry drinking water, a valve controlling the flow of water to the trough, a freely swinging hanger supporting the trough in freely swinging suspension, and a resilient mounting suspending the tough from the hanger such that when the water in the trough drops below a predetermined quantity the trough rises and opens the valve to permit more water to flow to the trough, characterized in that the fountain further includes a weight and a mounting for supporting the weight, which weight mounting is attached directly to the hanger independently of the resilient mounting of the trough to the hanger, whereby the weight minimizes swinging of the hanger and trough but does not affect the sensitivity of the resilient mounting of the trough for operating said valve.

In the preferred embodiment of the invention described below, the water trough is annular in shape and is carried at the lower end of a bell-shaped member, the weight mounting being disposed to support the weight within the latter member. The weight in this described embodiment is a water receptacle of slightly less external dimensions than the bell-shaped member.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
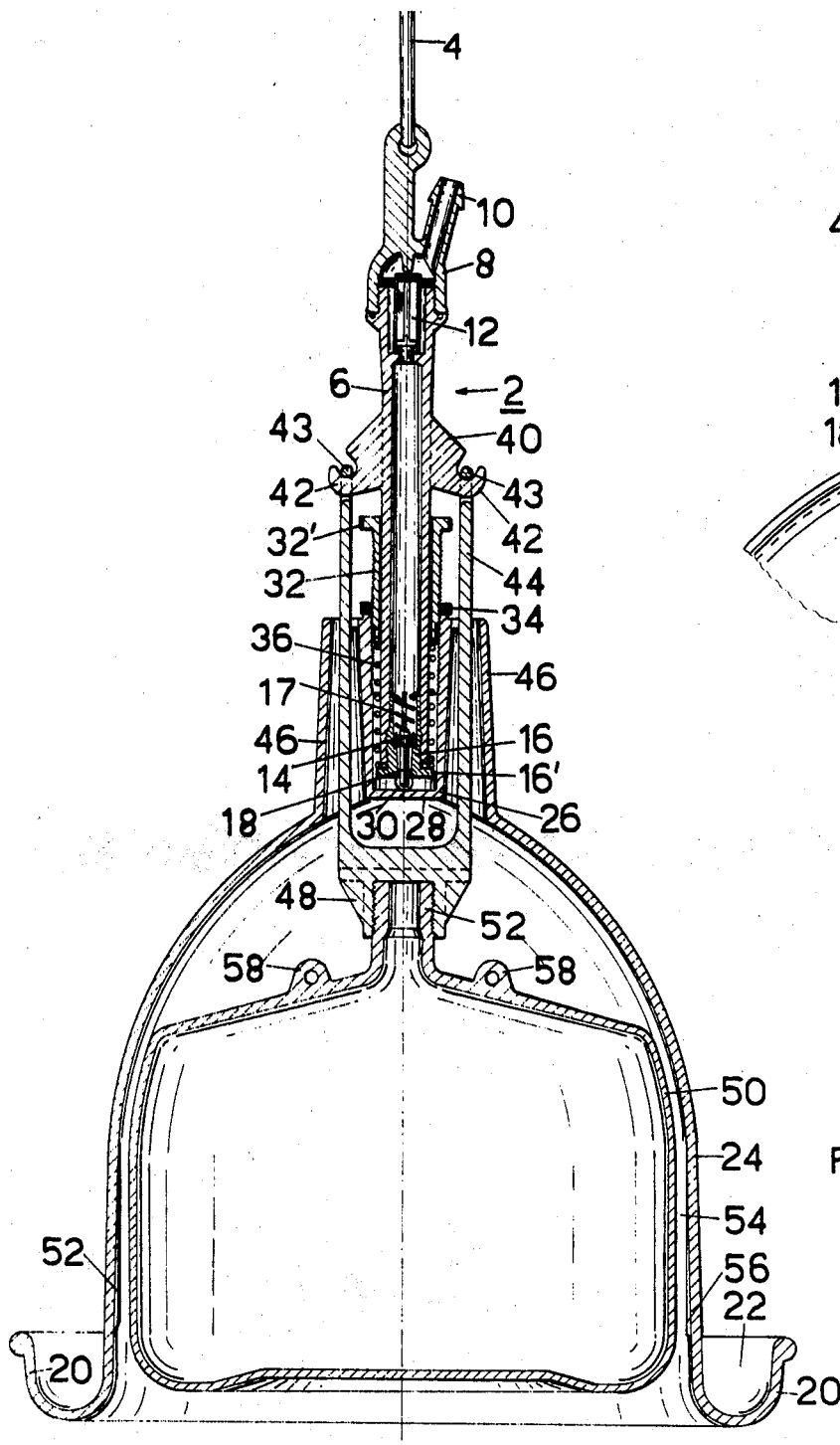
FIG. 1 is a longitudinal sectional view of a suspension-type poultry drinking fountain constructed in accordance with the present invention.
Figure 2:
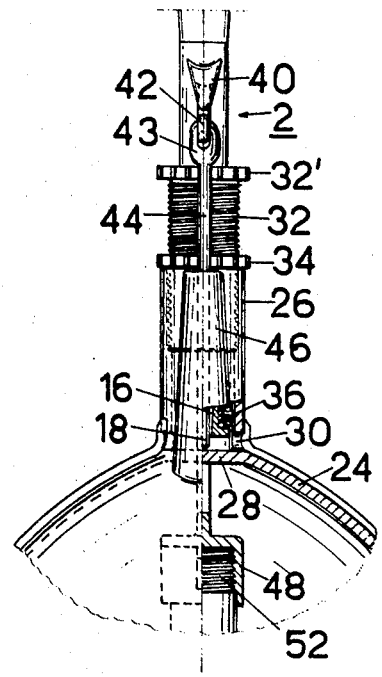
FIG. 2 is a side elevational view, partly in section, of a portion of the drinking fountain of FIG. 1 turned 90°.

The poultry drinking fountain illustrated in the drawings comprises a freely swinging hanger generally designated 2 including a hanger strap 4 for supporting the unit in freely swinging suspension, a tube 6, and a fitting 8 attached to the upper end of the tube. A water supply inlet 10 is carried at the upper end of fitting 8. The water passes through a filter 12 disposed within the upper end of tube 6, and then through the tube, exiting through a valve 14. The latter valve is enclosed within a casing 16 and is normally urged closed by a spring 17 but may be opened by an operator 18 protruding through the lower end of the casing.

The water trough 20 for the poultry drinking water 22 is annular in shape and is carried at the lower end of a bell-shaped member 24 with which it is integrally formed as a single unit, e.g. from plastic. Tube 6 and fitting 8 may also be made of plastic. The upper end of member 24 includes a narrow neck 26 open at the top and closed at the bottom by a wall 28. One or more openings 30 (two being shown) are formed at the bottom of neck 26 and permit the water passing through valve 14 to flow to the external surface of bell-shaped member 24 and along that surface to the water trough 20. The upper end of neck 26 is internally threaded and adjustably receives an externally threaded sleeve 32, which may be locked in position by nut 34. Sleeve 32 slidably envelopes tube 6 and may be knurled at the top 32' to facilitate its adjustment with respect to neck 26. A spring 36 is interposed between the lower end of sleeve 32 and external flange 16' on valve casing 16.

It will be seen that the water trough 20 and the bell-shaped member 24 float from the hanger 2 by means of spring 36, the latter forming a resilient mounting such that when the water within trough 20 falls below a predetermined quantity, the trough will rise, causing wall 28 to lift valve operator 18 to open the valve and to permit more water to flow through openings 30 to the water trough. When a sufficient quantity has been added to the trough, the trough lowers by the weight of the water therein, and valve operator 18 moves to its normally closed position by spring 17, cutting-off the further flow of water.

The foregoing structure, insofar as described above, is well known, but as indicated earlier, there is a large tendency for the water trough 20 to swing while the poultry drink from it, which is a serious drawback in this type of poultry drinking fountain.

An important feature in the novel fountain of the present invention resides in the provision of a weight which minimizes swinging but which does not affect the sensitivity of the valve 14 operation.

According to the invention, there is provided a pair of wings 40 integral with tube 6, each wing including a hook 42 adapted to receive an eye 43 formed at the upper end of each of a pair of arms of a bail 44. The latter arms each pass through one of a pair of covers 46 integral with bell-shaped member 24 into the interior of the member. The lower end of bail 44 carries an internally threaded element 48 for receiving a weight, in this case a receptacle 50 adapted to be filled with water. The mouth 52 of the receptacle is threaded and is removably received in element 48 of the bail. The diameter of water receptacle 50 (or other weight used, e.g. a block of concrete or metal) is slightly less than that of bell-shaped member 24 so as to provide a relatively small space or clearance 54 between the two. If desired the inside surface of member 24 may be provided with ribs 56 for reducing this clearance. Also, receptacle 50 may be formed with eyes 58 for receiving a handle (not shown) to facilitate carrying the receptacle.

The center of gravity of receptacle 50 when filled with water is in alignment with the longitudinal axis of the hanger, i.e. of tube 6. Its weight may be many times that of the elements supported by the resilient mounting 36. For example, the weight of the water-filled receptacle 50 may be about 5 kilograms, whereas the weight of all the elements supported by the resilient mounting 36 may be in the order of one-half kilogram.

It will be seen that the water receptacle 50 substantially lessens the swinging tendency of the hanger strap 4 and water trough 20 of the fountain in a very simple manner, and yet it does not affect the sensitivity of the resilient mounting for operating the valve 14 since it is supported independently of this mounting.

Many variations, modifications, and further applications of the illustrated embodiment of the invention will be apparent.

I claim:

1. A suspension-type poultry drinking fountain comprising a water trough adapted to contain the poultry drinking water a valve controlling the flow of water to the trough, a freely swinging hanger supporting said trough in freely swinging suspension, and a resilient mounting suspending said trough from said hanger such that when the water in the trough drops below a predetermined quantity the trough rises and opens the valve to permit more water to flow therethrough to the trough, characterized in that said fountain further includes a weight and a mounting for supporting said weight, said weight mounting being attached directly to said hanger independently of said resilient mounting of the trough to the hanger, whereby the weight minimizes swinging of the hanger and trough but does not affect the sensitivity of said resilient mounting of the trough for operating said valve.

2. A fountain as defined in claim 1, wherein said trough is annular in shape and is carried at the lower end of a bell-shaped member, said weight mounting being disposed to support the weight within said bell-shaped member.

3. A fountain as defined in claim 1, wherein said weight mounting comprises a bail having a pair of arms attached at their upper ends to said hanger, said bail carrying at its lower end a supporting element for supporting the weight such that the center of gravity of the weight is in alignment with the axis of said hanger.

4. A fountain as defined in claim 1, said trough being carried at the lower end of a bell-shaped member, said weight being a water receptacle of slightly less external dimensions than said bell-shaped member and disposed within said latter member with its center of gravity, when filled with water, being in alignment with the axis of said hanger.